US006768998B2

(12) United States Patent
Leonard et al.

(10) Patent No.: US 6,768,998 B2
(45) Date of Patent: Jul. 27, 2004

(54) SYSTEMS AND METHODS FOR NETWORK-BASED TECHNICAL LIBRARY

(75) Inventors: James E. Leonard, San Jose, CA (US); James Leslie King, San Jose, CA (US); Dianna Marie Dominguez, San Jose, CA (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 09/683,367

(22) Filed: Dec. 19, 2001

(65) Prior Publication Data

US 2003/0115210 A1 Jun. 19, 2003

(51) Int. Cl.⁷ .............................................. G06F 17/30

(52) U.S. Cl. ..................... 707/102; 707/100; 707/104.1

(58) Field of Search ............................... 707/1–10, 100, 707/101, 102, 204, 511, 517, 503, 104.1; 705/1; 701/33; 709/203

(56) References Cited

U.S. PATENT DOCUMENTS

| | | | |
|---|---|---|---|
| 5,257,185 A | * | 10/1993 | Farley et al. ................ 707/100 |
| 5,826,252 A | | 10/1998 | Wolters, Jr. et al. |
| 6,167,394 A | | 12/2000 | Leung et al. |
| 6,263,265 B1 | | 7/2001 | Fera |
| 2002/0023109 A1 | * | 2/2002 | Lederer et al. .............. 707/511 |
| 2002/0042687 A1 | * | 4/2002 | Tracy et al. ................ 702/119 |
| 2002/0091756 A1 | * | 7/2002 | Goodwin ..................... 709/203 |
| 2003/0050935 A1 | * | 3/2003 | Spetsmann ............... 707/104.1 |
| 2003/0097211 A1 | * | 5/2003 | Carroll et al. ................. 701/33 |
| 2003/0101072 A1 | * | 5/2003 | Dick et al. ...................... 705/1 |

* cited by examiner

Primary Examiner—Charles Rones
Assistant Examiner—Neveen Abel-Jalil
(74) Attorney, Agent, or Firm—Armstrong Teasdale LLP

(57) ABSTRACT

A method for providing technical information using a network-based system. The system includes a server system in communication with a database and at least one client system. The method includes storing the technical information in the database, appending summary data to the technical information, validating the technical information, and providing the technical information in response to an inquiry from an authorized user.

28 Claims, 14 Drawing Sheets

GEI-80875K

TABLE OF CONTENTS

| | | | PAGE |
|---|---|---|---|
| SECTION I | | DESCRIPTION AND THEORY OF OPERATION | |
| 1-1 | GENERAL | | 1-1 |
| 1-3 | APPLICATION NOTICE | | 1-1 |
| 1-5 | SPECIFICATIONS | | 1-1 |
| 1-7 | THEORY OF OPERATION | | 1-2 |
| 1-8 | | Function | 1-2 |
| 1-9 | | Operation | 1-3 |
| SECTION II | | INSTALLATION AND CHECKOUT | |
| 2-1 | GENERAL | | 2-1 |
| 2-3 | | Packing | 2-1 |
| 2-4 | | Installation | 2-1 |
| 2-5 | | Precautions | 2-1 |
| 2-6 | TROUBLESHOOTING AND CHECKOUT PROCEDURES | | 2-1 |
| 2-8 | TESTING SIGNAL OUTPUTS FROM SCINTILLATION | | 2-2 |
| | DETECTOR ASSEMBLIES | | |
| 2-9 | | Crystal-Photomultiplier Unit | 2-2 |
| 2-11 | | Replacement | 2-2 |
| 2-12 | | Testing | 2-3 |

FIG. 10

Technical Library

Choose a Library to view Documents from: ←— 902

(You must choose at least one)

☐ BWR Operator's Manual for Material and Processes
☐ Rapid Information Communication SIL (RICSIL) ←— 904
☐ Service Advice Letters (SAL)
☐ Service Information Letters (SIL) ←— 900
☐ Technical Design Procedures
☐ Web Accessible Manual Service (WAMS)

| Select All Libraries |

Search Information

Search Terms: [          ] ←— 906
Limit Search to 50 results? ☐

| Submit Query |—— 910

| Advanced Search |—— 912

Technical Library

Search Results

← 1000

Search on values: analog ← 1006

MEAN SQUARE ANALOG MODULE

Library Name: Web Accessible Manual Service (WAMS) ← 1002
Document Number: GEK-855
Document Revision: R ← 1004
Author:
Publication Date: 12/01/1999
Keywords: MEAN SQUARE ANALOG MODULE, 194X669G1, G4

| Select Document | ← 1008

FIG. 13

Technical Library

Choose a Library to view Documents from:

(You must choose at least one)

- ☐ BWR Operator's Manual for Material and Processes
- ☐ Rapid Information Communication SIL (RICSIL)
- ☐ Service Advice Letters (SAL)
- ☐ Service Information Letters (SIL)
- ☐ Technical Design Procedures
- ☑ Web Accessible Manual Service (WAMS)

— 1100
— 1102
— 1104

[ Select All Libraries ]

Searchable fields

| | |
|---|---|
| Document Name: | — 1112 |
| Document Number: | — 1114 |
| Document Revision: | — 1116 |
| Document Author: | — 1118 |
| Keywords: | — 1120 |
| Publication Date: (MM/DD/YYYY) | From date: <br> To date: — 1122 |
| Limit Search to 50 results? | ☑ — 1124 |
| Include all revisions? | ☐ — 1126 |

— 1106

[ Submit Query ] — 1110

SYSTEMS AND METHODS FOR NETWORK-BASED TECHNICAL LIBRARY

COPYRIGHT STATEMENT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

This invention relates generally to providing technical information and, more particularly, to network-based systems and methods for providing technical information.

Strict compliance with regulations and technical requirements is necessary for safe operation, particularly in government regulated industries, such as nuclear power production, transportation, defense, and aircraft maintenance. Access to current, reliable technical information is required during construction, operation and maintenance in such industries. In the nuclear power industry, for example, nuclear power plant operators, technicians and administrators need reliable and current technical information regarding instruments and equipment used during operation and maintenance. The technical information includes, for example, maintenance manuals providing equipment specifications, and technical reports providing updates on equipment, procedures, requirements and recommendations. Efficiently providing technical information to the users is challenging because of the volume of information and the routine but irregular revision of the technical information. Historically, technical information has been available to users in paper or other hardcopy form. Storage requirements, retrieval problems, and difficulties in assessing the reliability or current status of a given document or piece of technical information limits the efficiency of hardcopy technical document or technical libraries. Use of outdated information can result in delayed system operation, extended or additional maintenance, and increased system cost.

SUMMARY OF INVENTION

In one aspect, a method for providing technical information using a network-based system is provided. The system includes a server system in communication with a database and at least one client system. The method includes storing the technical information in the database, appending summary data to the technical information, validating the technical information, and providing the technical information in response to an inquiry from an authorized user.

In a further aspect, a network-based system for providing technical information is provided. The network-based system includes a client system, including a browser, a database for storing information, and a server system. The server system is configured to be in communication with the client system and the database. The server system is further configured to receive technical information, store the technical information in the database, append summary data to the technical information, validate the technical information, and provide technical information in response to an inquiry.

In a further aspect, a computer program embodied on a computer readable medium is provided for providing technical information. The program includes a code segment that receives technical information, maintains a database by adding, deleting and updating technical information, and maintains the database by adding, deleting and updating summary data appended to the technical information. The code also validates the technical information and provides the technical information to users.

BRIEF DESCRIPTION OF DRAWINGS

FIG. 10 is an exemplary embodiment of a user interface of NTLS displaying technical information for a technical information option.

FIG. 12 is an exemplary embodiment of a user interface of NTLS displaying a search interface.

FIG. 13 is an exemplary embodiment of a user interface of NTLS displaying a search results interface.

FIG. 14 is an exemplary embodiment of a user interface of NTLS displaying an advanced search interface.

DETAILED DESCRIPTION

Figure 1:
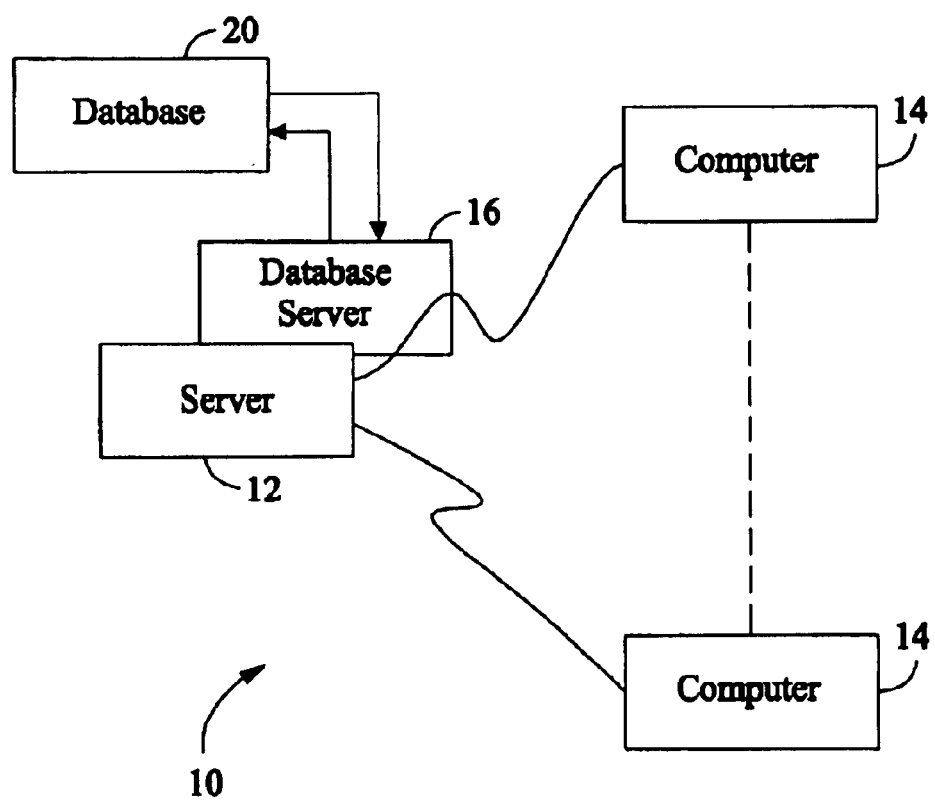
FIG. 1 is a simplified block diagram of a Networked Technical Library System (NTLS) in accordance with one embodiment of the present invention.

Exemplary embodiments of systems, methods, and computer programs that facilitate integrated network-based technical information flow related to the Networked Technical Library System (NTLS) are described below in detail. The systems, methods, and computer programs facilitate, for example, electronic distribution of technical information using a client system, including validation of the technical information.

The NTLS collects, tracks, schedules, and disseminates technical information. In an exemplary embodiment, a NTLS collects, validates, and disseminates current information regarding technical information relevant to a boiling water reactor (BWR) plant. In another embodiment, NTLS collects, validates, and disseminates technical information on other plants or systems including, but not limited to, pressurized water reactor (PWR), liquid metal reactor (LMR), aircraft, ships, or other engineering systems. The technical information in the NTLS is used by operators and technicians that may be associated with plant owners, operators, primary contractors, subcontractors, inspectors and regulators, collectively called users. The NTLS is maintained by library administrators.

Technical information relating to each plant or system is received by NTLS which stores the technical information in a database, appends summary data to the technical information, validates the technical information and provides the technical information in response to an inquiry. The technical information includes, but is not limited to, maintenance manuals, technical specifications, equipment manuals, analysis information, technical reports, operating procedures, and repair procedures for selected equipment or assemblies in the plant. The system provides a readily accessible, single source library for the users to access relevant technical information. The system allows access to current information, and, in one embodiment, includes prior versions of relevant technical information. The system also provides summary data, appended to the technical information for the user's review, particularly when searching the technical information. Delays in obtaining the current technical information can generate costly plant operability delays and increased expense.

In the NTLS, technical information is stored in the database. The NTLS provides convenient, network-based access to validated technical information. From the NTLS home page, the user has an option to access sub-libraries of technical information, search for a specific technical information document or obtain information regarding the NTLS.

In one embodiment, the system is a computer program embodied on a computer readable medium implemented utilizing a JAVA-type language with a client user interface front-end for administration and a web interface for standard user input and reports. In an exemplary embodiment, the system is fully accessed by individuals having an authorized access outside the firewall of the business-entity through the Internet. In yet another embodiment, the system is web enabled and is run on a business-entity's intranet. In one embodiment, the system operates in a Windows NT environment. The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other processes.

FIG. 1 is a simplified block diagram of a Networked Technical Library System (NTLS) 10 that includes a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is in communication with a database 20 containing information on a variety of technical information, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
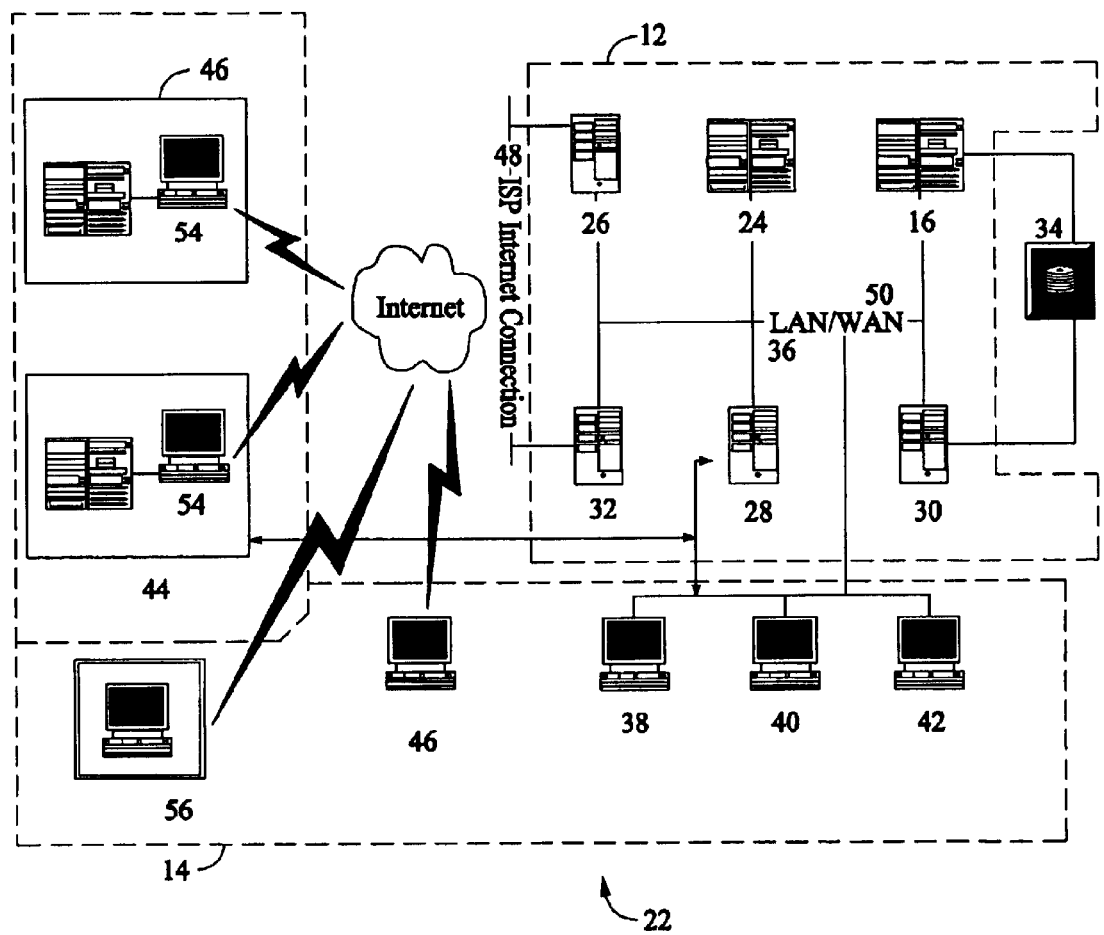
FIG. 2 is an expanded version block diagram of an exemplary embodiment of a server architecture of the NTLS.

FIG. 2 is an expanded version block diagram of an exemplary embodiment of a server architecture of a QA event Coordination System (NTLS) 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is in communication with database server 16 and directory server 30. Servers 16, 24, 26, 28, 30, and 32 are coupled in a local area network (LAN) 36. In addition, a system administrator's workstation 38, a user workstation 40, and a supervisor's workstation 42 are in communication with LAN 36. Alternatively, workstations 38, 40, and 42 are in communication with LAN 36 via an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at any one of many personal computers in communication with LAN 36. Work stations 38, 40, and 42 are illustrated as being associated with separate functions only to facilitate an understanding of the different types of functions that can be performed by individuals having access to LAN 36.

Server system 12 is configured to be in communication with to various individuals workstations, including users at a remote user workstation 44 and administrators at a remote administrator's workstation 46, via an ISP Internet connection 48. The communication in the exemplary embodiment is illustrated as being performed via the Internet, however, any other wide area network (WAN) 50 type communication can be utilized in other embodiments, i.e., the systems and processes are not limited to being practiced via the Internet. In addition, and rather than WAN 50, local area network 36 could be used in place of WAN 50.

In the exemplary embodiment, any authorized individual or business-entity having a workstation 54 can access NTLS 22. One of the client systems includes a manager's workstation 56 located at a remote location. Work stations 54 and 56 are personal computers having a web browser. Also, work stations 54 and 56 are configured to communicate with server system 12.

Figure 3:
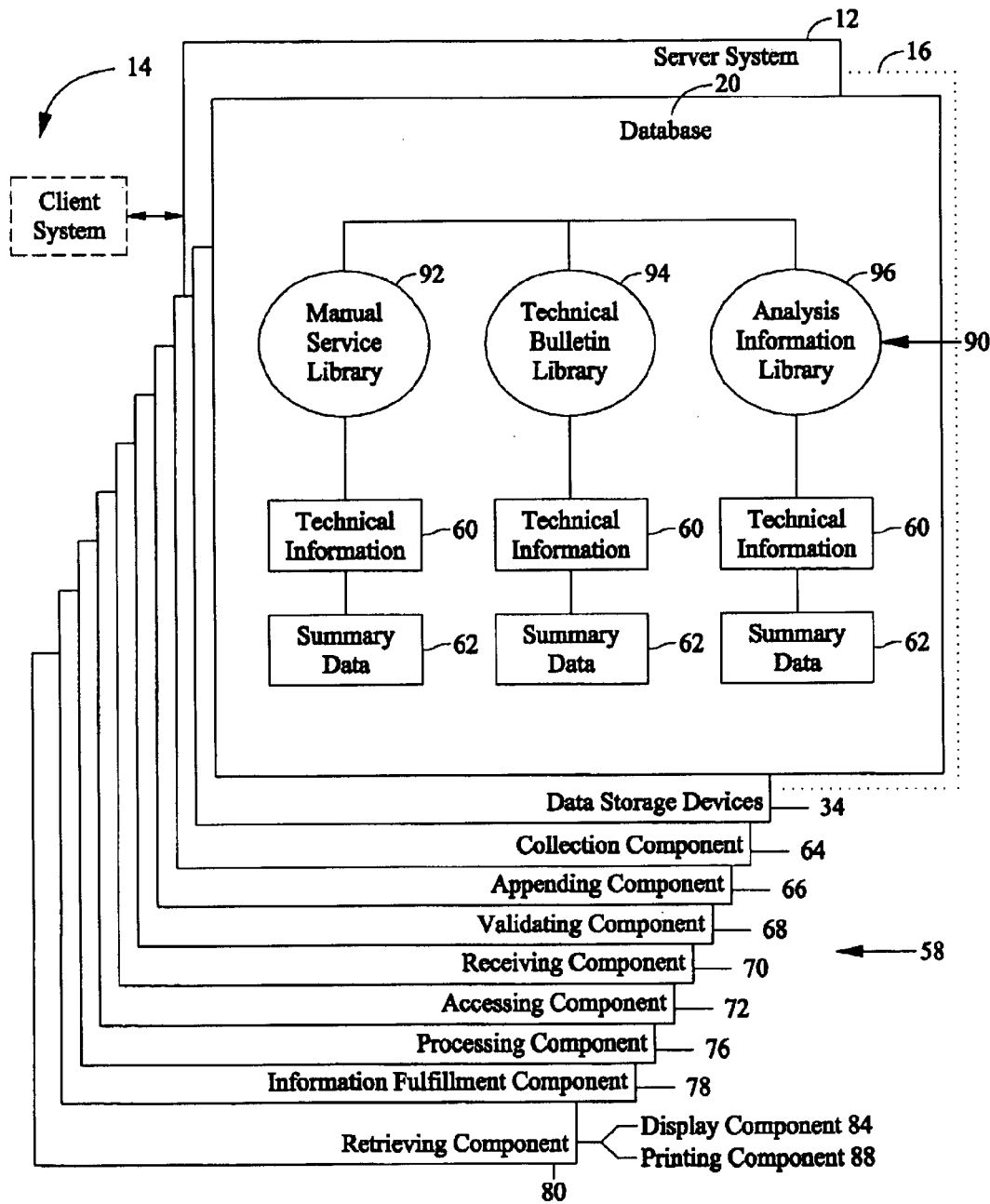
FIG. 3 shows a configuration of a database within the database server of the server system with other related components.

FIG. 3 shows a configuration of database 20 within database server 16 of server system 12 shown in FIG. 1. Database 20 is in communication with several separate computer software components 58 within server system 12, which perform specific tasks. Server system 12 includes a collection component 64, an appending component 66, and a validating component 68. Collection component 64 collects a technical information 60 from administrator's workstation 38 and stores technical information 60 in database 20. Appending component 66 facilitates the administrator in compiling a summary data 62 from technical information 60 and appending summary data 62 to technical information 60 in database 20. Validating component 68 validates technical information 60.

Server system 12 also includes a receiving component 70 to receive a specific request or query, including queries from client system 14, and an accessing component 72 to access database 20. Receiving component 70 is programmed for receiving a query from one of a plurality of users. Server system 12 further includes a processing component 76 for searching and processing received queries against database 20, containing technical information 60, collected by collection component 64 and summary data 62 provided by appending component 66. An information fulfillment component 78, located in server system 12, downloads technical information 60 or appending summary data 62 to the plurality of users in response to the requests received by receiving component 70. Information fulfillment component 78 downloads the information after the information is retrieved from database 20 by a retrieving component 80. Retrieving component 80 retrieves, downloads and sends information to client system 14 based on a query received from client system 14.

Retrieving component 80 further includes a display component 84 configured to download information to be displayed on a client system's graphical user interface and a printing component 88 configured to print information. Retrieving component 80 generates reports requested by the user through client system 14 in a pre-determined format. System 10 is flexible to provide other alternative types of reports and is not constrained to the options set forth above. In one embodiment, collection component 64, appending component 66, validating component 68, receiving component 70, accessing component 72, processing component 76, information fulfillment component 78, retrieving component 80, display component 84, and printing component 88 are computer programs, subprogram, or applications embodied on computer readable medium.

In one embodiment, database 20 is divided into sub-libraries 90. Sub-libraries 90 include, as examples, but are not limited to, a Manual Service Library (MSL) 92, a Technical Bulletin Library (TBL) 94, and an Analysis Information Library (AIL) 96. Each sub-library 92, 94, 96 contains technical information 60 and summary data 62 specific to a plant service area. MSL 92, TBL 94 and AIL 96 facilitate controlling access to authorized users. In another embodiment database 20 includes additional sub-libraries.

MSL 92 includes technical information 60 relevant to various equipment manuals. Each equipment manual is handled by NTLS as a separate unit of technical information 60. In the exemplary embodiment, technical information 60 includes selected equipment manuals and documents in a computer usable form. Summary data 62 relevant to each technical information 60 is appended to each technical information 60. In one embodiment summary data 62 includes document number, document name, document revision, author, publication date, upload date, keywords, and comments.

TBL 94 includes technical information 60 relevant to various technical bulletins and documents issued by agencies or groups. Technical bulletins typically provide users with information regarding general issues or studies. Each technical bulletin is handled by NTLS as a separate unit of technical information 60. In the exemplary embodiment, technical information 60 includes selected technical bulletins in computer usable form. Summary data 62 relevant to each technical information 60 is appended to each technical information 60. In one embodiment summary data 62 includes document number, document name, document revision, author, publication date, upload date, keywords, and comments.

AIL 96 includes technical information 60 relevant to analysis information reports and documents issued by agencies or groups. Analysis information reports typically provide users with information regarding specific issues or studies. Each analysis information report is handled by NTLS as a separate unit of technical information 60. In the exemplary embodiment, technical information 60 includes selected analysis information reports in computer usable form. Summary data 62 relevant to each technical information 60 is appended to each technical information 60. In one embodiment summary data 62 includes document number, document name, document revision, author, publication date, upload date, keywords, and comments.

System 10 includes a variety of classified and proprietary data. Therefore, system 10 has different access levels to control and monitor the security of the system. Authorization for access is assigned by system administrators based on predetermined parameters. In one embodiment, system 10 provides access based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information. Based on the nature of the technical information, restricted access is built into system 10. Specifically, system 10 restricts an authorized user to only the system data that the user is authorized to access.

The architectures of system 10, as well as various components of system 10, are exemplary only. Other architectures are possible and can be utilized in connection with practicing the processes described below.

Figure 4:
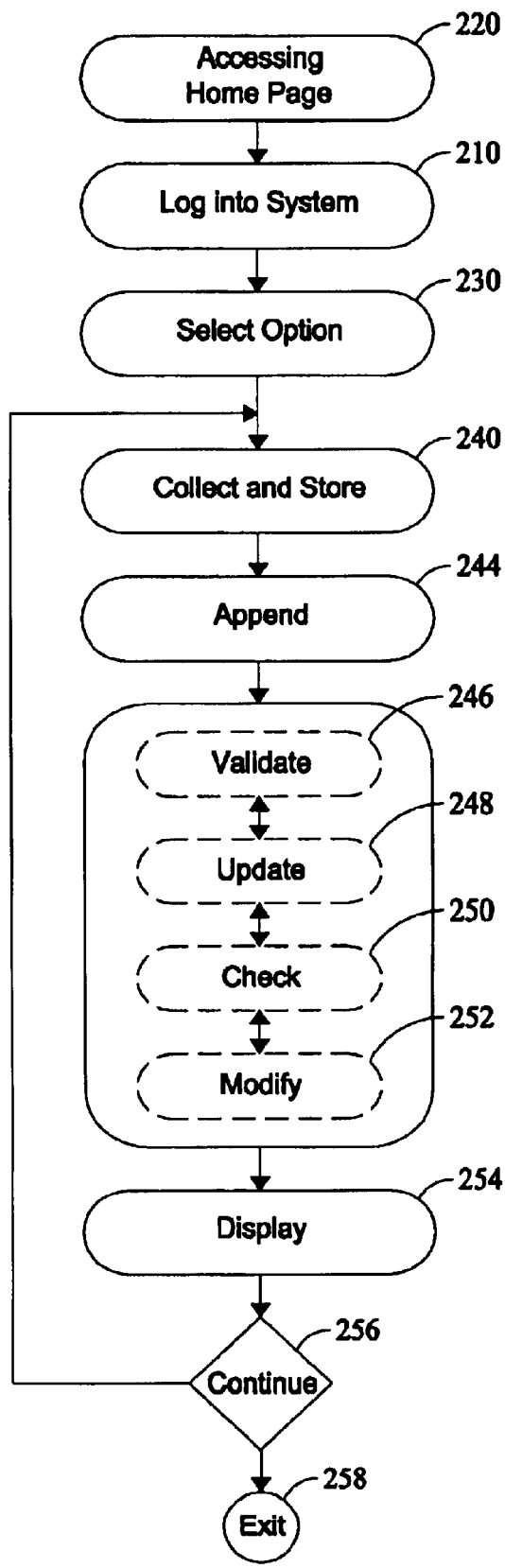
FIG. 4 is a flowchart of the processes employed by NTLS to facilitate administration.

FIG. 4 is a flowchart 200 of the processes employed by system 10 to facilitate administration. Referring to FIGS. 3 and 4, initially, the administrator accesses 220 administrator interface of the web site through client system 14 (shown in FIG. 1). In one embodiment, client system 14, as well as server system 12, are protected from access by unauthorized individuals. For security the administrator is required to log into 210 to system 10 using at least one password (not shown). The administrator interface displays options available to the administrator including collecting and storing 240 technical information 60. In one embodiment the administrator can control user access to system 10. The administrator selects 230 to collect and store 240 technical information 60 collection component 64 stores 240 technical data 60 in a computer usable form in database 20. The administrator uses appending component 66 to select and append 244 summary data 62 to technical information 60 in database 20. The administrator uses validating component 68 to validate 246 technical information 60 and summary data 62. Validating 246 includes updating 248 prior technical information 60 and summary data 62. In one embodiment, prior technical information 60 is retained in system 10 for user reference. In another embodiment prior technical information 60 is removed when it is superceded. Prior summary data 62 is retained with prior technical data 60. Some technical information 60, such as technical bulletins, may be superceded in total, while other technical information 60, such as equipment manuals, are sometimes modified in part and sometimes superceded in total. Validating 246 also checks 250 to verify if technical information 60 is the effective version. In another embodiment, validating 246 also checks 250 that technical information 60 is the most current version available. Validating 246 also includes modifying 252 summary data 62 appended to technical information 60. Validating 246 further includes check 250 by validating component 68 to determine the elapse time since the last update to a unit of technical information 60. The administrator sets the elapse time for a specific unit of technical information 60 needed to generate a check notice to the administrator. System 10 displays 254 technical information 60 and summary data 62 for the administrator. administrator can continue 256 to collect and store 240 additional technical information 60 into database 20 or exit 258 from system 10.

Figure 5:
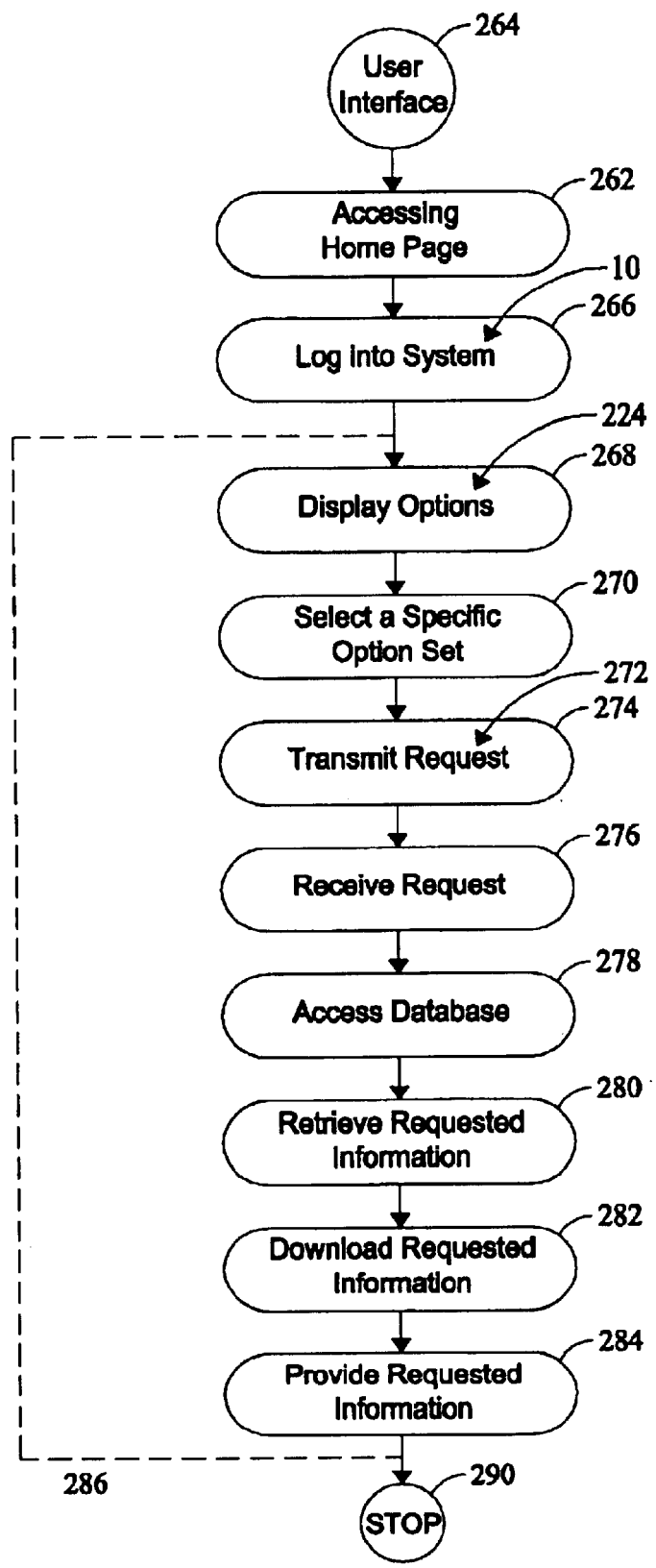
FIG. 5 is a flowchart of the processes employed by NTLS to facilitate use.

FIG. 5 is a flowchart 260 of the processes employed by system 10 to facilitate use. Referring to FIGS. 3, 4, and 5, initially, the user accesses 262 user interface 264 of the web site through client system 14 (shown in FIG. 1). In one embodiment, client system 14, as well as server system 12, are protected from access by unauthorized individuals. The user is required to log into 266 system 10 using at least one password (not shown). System 10 displays 268 options 224 available to the user including, for example, sub-library 90 selection or document search on client system 14. Once the user selects an option 270, such as sub-library 90 selection, from the available links, the request 272 is transmitted 274 to server system 12. Transmitting 274 the request is accomplished either by click of a mouse or by a voice command. Once server system 12 (shown in FIG. 1) receives 276 the request, server system 12 accesses 278 database 20 (shown in FIG. 1). System 10 retrieves 280 requested information from database 20. The requested information is downloaded 282 and provided 284 to client system 14 from server 12. The user can continue to search 286 database 20 for other information or exit 290 from system 10.

Figure 6:
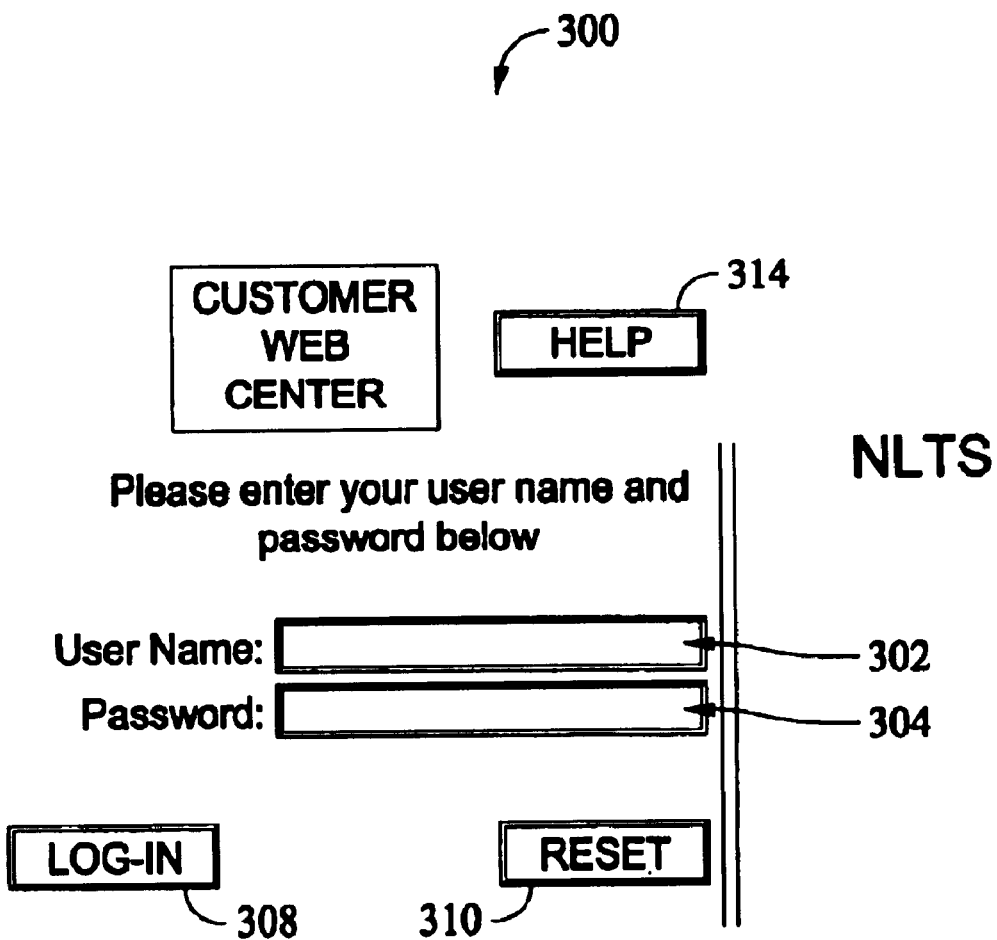
FIG. 6 is an exemplary embodiment of a user interface displaying a home page of NTLS.

FIG. 6 is an exemplary embodiment of a user interface 300 displaying a home page of NTLS 10 (shown in FIG. 1). User interface 300 requires the user to provide a valid user name 302 and a valid user password 304 to access NTLS 10. User interface 300 allows the user to log into 266 (shown in FIG. 5) to system 10 and is linked to database 20. User interface 300 is the entry point for users to access NTLS 10 via the web. A "Login" button 308 and a "Reset" button 310 are provided. Selection of the Login button 308 after entry of user name 302 and user password 304 provides the next interface. In one embodiment, user interface 300 displays links facilitating the selection of alternative systems or help systems.

Figure 7:
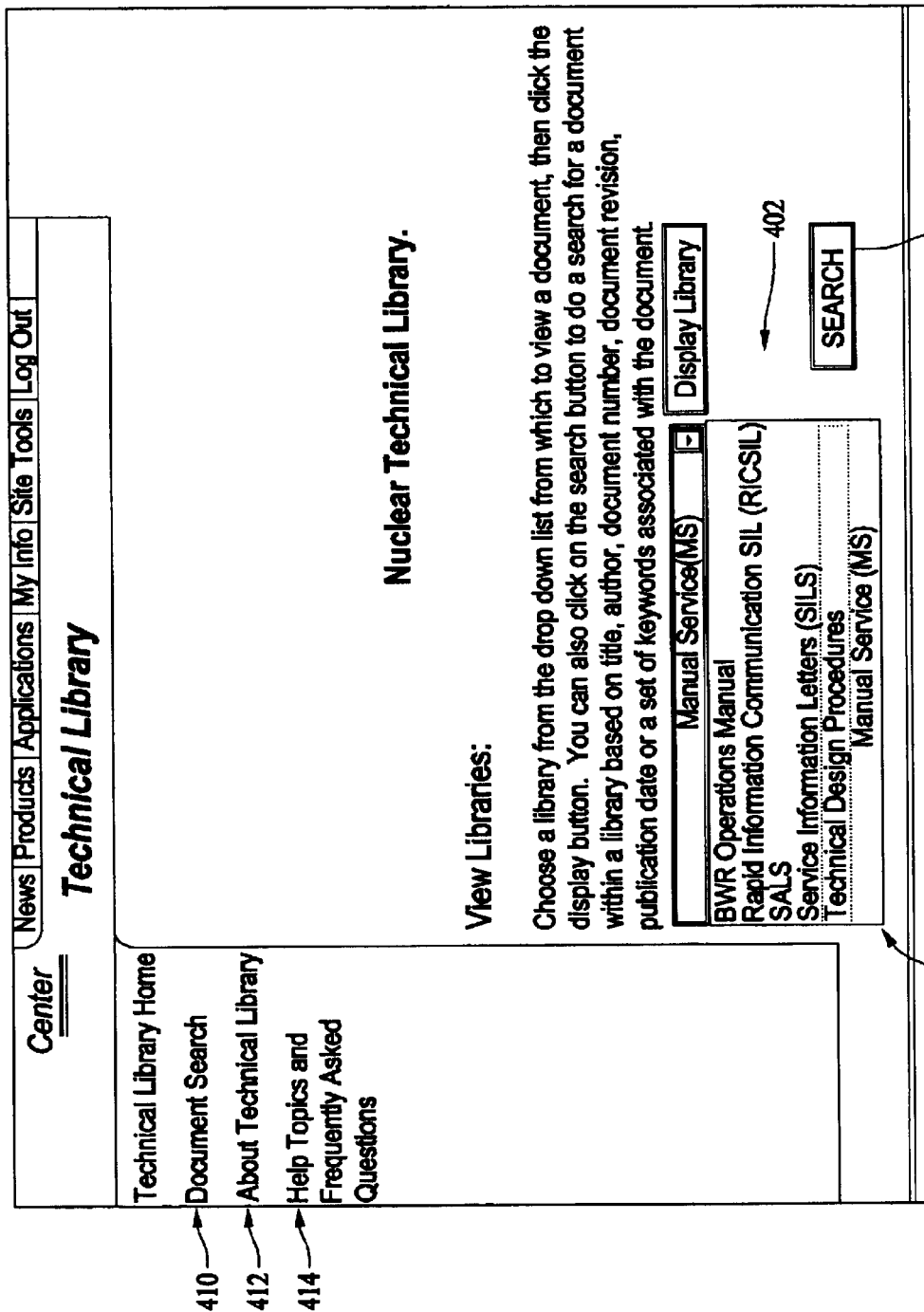
FIG. 7 is an exemplary embodiment of a user interface of NTLS displaying sub-library selection options.

FIG. 7 is an exemplary embodiment of a user interface 400 of NTLS 10 displaying sub-library selection options 402. Referring to FIGS. 3 and 7, in one embodiment, user interface 400 is displayed on the client system 14 once the user has logged into NTLS 10 (shown in FIG. 6). User interface 400 facilitates selecting sub-libraries 90 for the selected plant. User Interface 400 provides user-a pull-down list 404 to select the desired sub-library 92, 94 or 96. User interface 400 provides a "Search" button 406 to select a search interface using summary data 62, as described below. In one embodiment, user interface 400 displays a search interface link 410 and help interface links 412 and 414.

Figure 8:
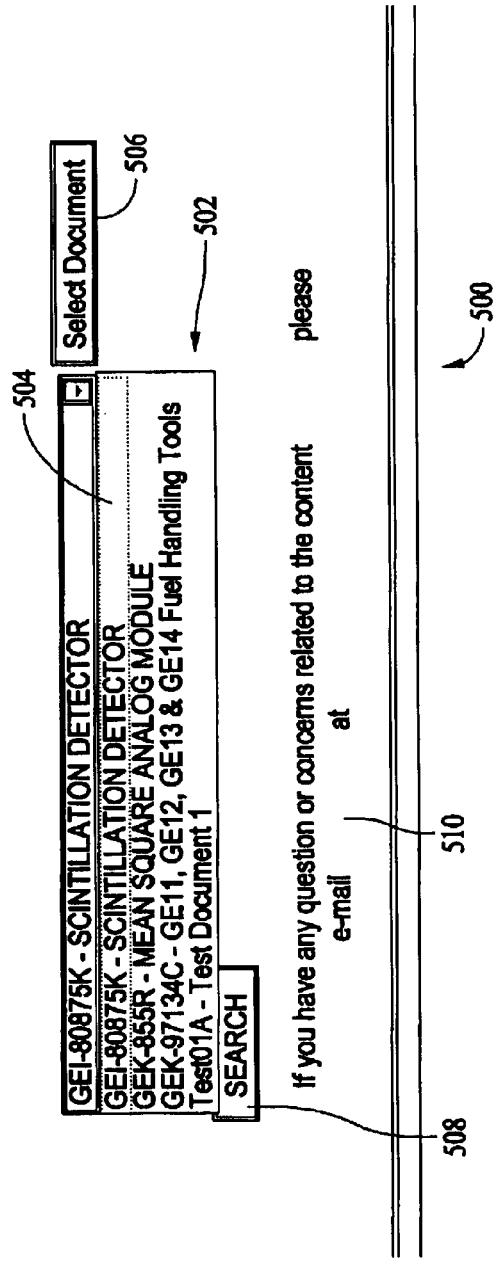
FIG. 8 is an exemplary embodiment of a user interface of NTLS displaying MSL technical information options.

FIG. 8 is an exemplary embodiment of a user interface 500 of NTLS 10 displaying MSL 92 technical information options 502. Referring to FIGS. 3, 7, and 8, in one embodiment, user interface 500 is displayed on the client system 14 once the user has selected MSL 92 from pull-down list 404. User interfaces for other sub-libraries 94 and 96 are similar. In the exemplary embodiment, user interface 500 displays technical information options 502 as a pull-down list displaying various technical information 60, including technical information option 504 for a GEI-80875K-Scintillation Detector. Technical information option 504 is selected by a "Select Document" button 506, by click of a mouse, a keyboard operation, or a voice command. In another embodiment, system 10 displays technical information options 502 in a hypertext link format. In one embodiment, each technical information options 502 is an active link that can be selected by placing the pointer or mouse cursor on the desired technical information 60 and clicking or selecting by voice command. User interface 500 provides a "Search" button 508 to select a search interface using summary data 62, as described below. User interface 500 also provides an email link 510. In one embodiment, user interface 500 displays a search interface link, help interface links, and a return link to return to user interface 400.

Figure 9:
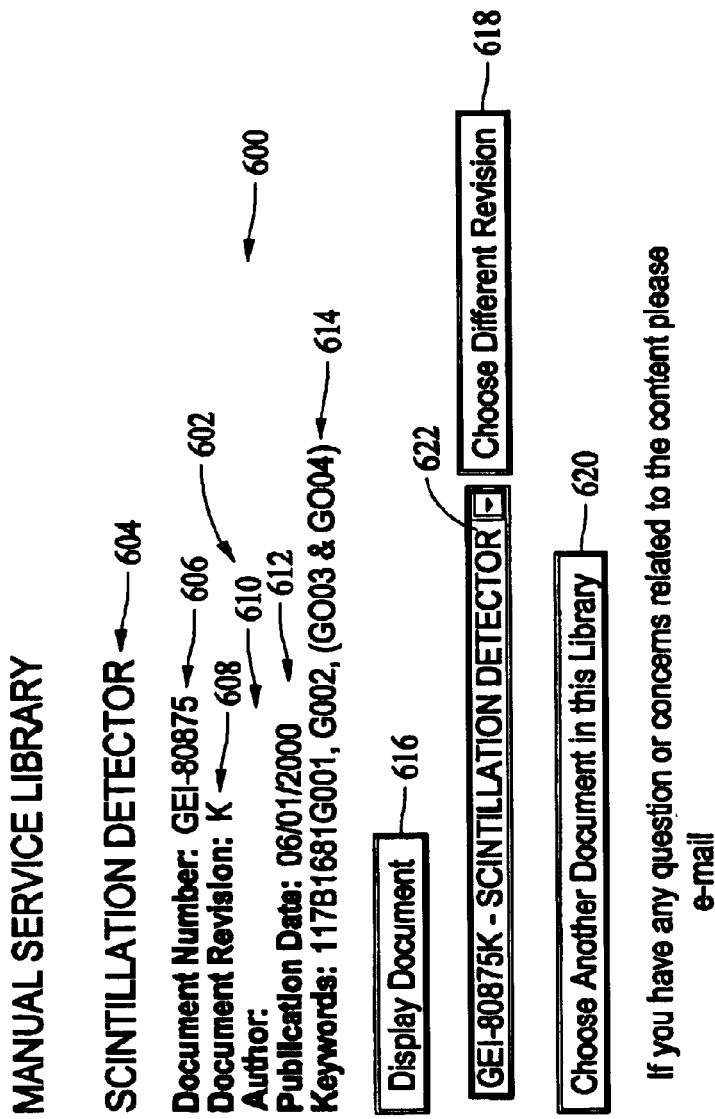
FIG. 9 is an exemplary embodiment of a user interface of NTLS displaying summary data for technical information options.

FIG. 9 is an exemplary embodiment of a user interface 600 of NTLS 10 displaying summary data 602 for technical information option 504 (shown in FIG. 8). User interface 600 is displayed on the client system 14 once the user has selected technical information option 504 from technical information options 502 (shown in FIG. 8). In an exemplary embodiment, user interface 600 displays summary data 602 including document name 604, document number 606, document revision 608, author 610, publication date 612, and keywords 614. In another embodiment summary data 602 also includes upload date and comments. In another embodiment summary data 602 includes at least one of document name 604, document number 606, document revision 608, author 610, publication date 612, and keywords 614. User interface 600 provides a "Display Document" button or link 616, a "Choose Different Revision" pull-down list button 618 and a "Choose Another Document in this Library" button or link 620. Button 620 returns user to user interface 500. Button 618 provides a pull-down list 622 for selection of a prior version of technical information option 502. Selection of Display Document button 616 provides technical information 60 for technical information option 504.

FIG. 10 is an exemplary embodiment of a user interface 700 of NTLS 10 displaying technical information 702 for technical information option 504 (shown in FIG. 8). Technical information 702 includes a technical document 704 in a computer usable form 706, for example, Microsoft® Word, Microsoft® Excel, Adobe Acrobat® Reader, and other similar viewing applications. User interface 700 is displayed on the client system 14 when the user selects a specific technical information option 502 from user interface 500 (shown in FIG. 8). In an exemplary embodiment, technical information 702 includes a technical document 704 in a computer usable form 706, and a bookmark tool 708. The user can scroll through technical document 704 or can use bookmark tool 708 to move through technical document 704. In an exemplary embodiment, user interface 700 is displayed in a limited portion of client system 14, such as a pop-up box. In another embodiment user interface 700 includes help interface links, and a return link to return to user interface 400 (shown in FIG. 7).

Figure 11:
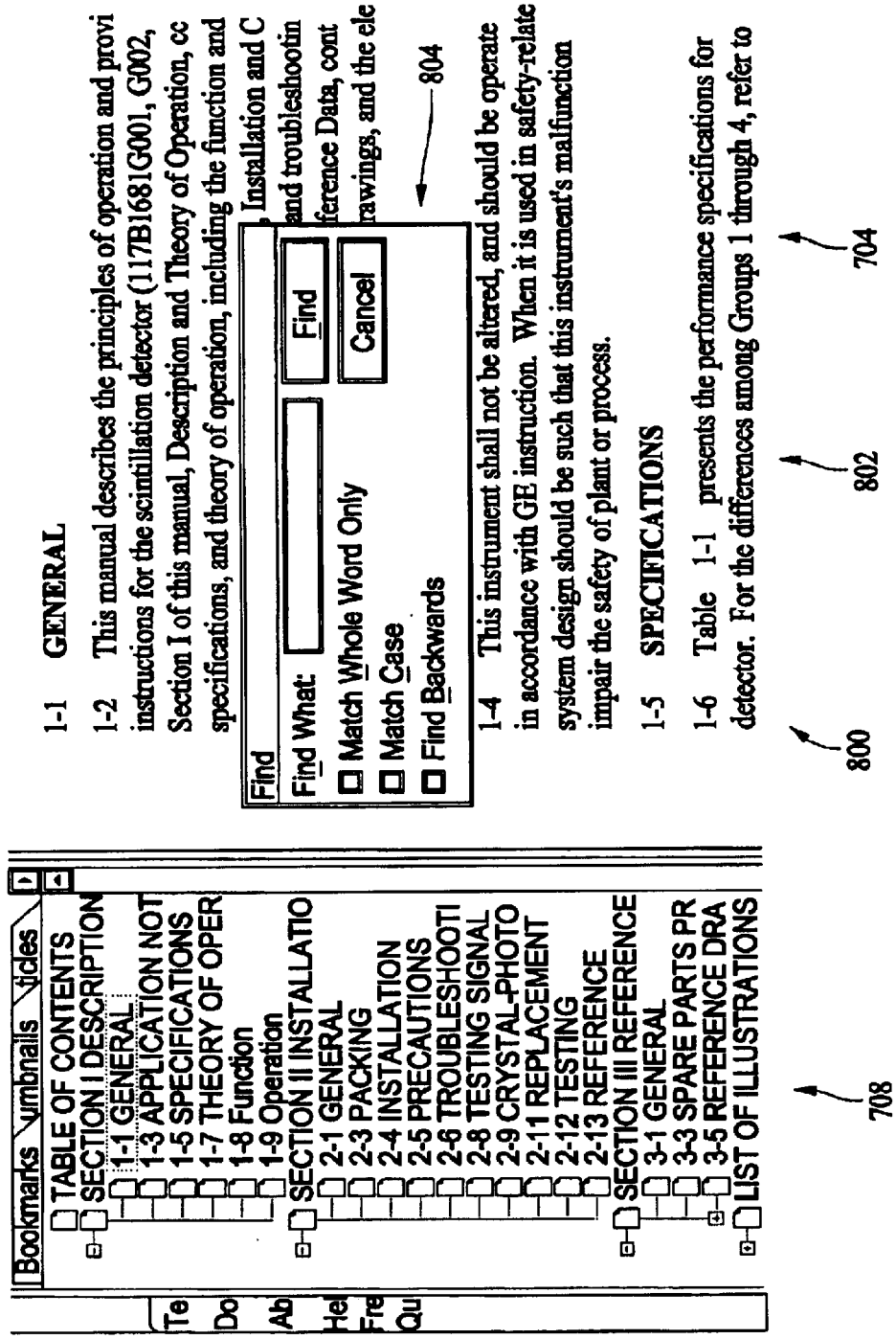
FIG. 11 is an exemplary embodiment of a user interface of NTLS displaying a section of a technical document.

FIG. 11 is an exemplary embodiment of a user interface 800 of NTLS 10 displaying a section 802 of technical document 704. In addition to section 802 and bookmark tool 708, interface 800 displays a section 804 to facilitate user search of technical document 704 for specific terms or words.

FIG. 12 is an exemplary embodiment of a user interface 900 of NTLS 10 displaying a search interface 902. Search interface 902 includes a library selection field 904, a search term field 906, a "Submit Query" button 910, and an "Advanced Search" button 912. User interface 900 is displayed on the client system 14 when the user selects Document Search 410 or Search button 406 (shown in FIG. 7). Search interface 902 facilitates the user searching technical information 60 in at least one sub-library 90 for terms or words provided by the user. Server 12 searches technical information 60 in the specified sub-library for the specified term in search term field 906.

FIG. 13 is an exemplary embodiment of a user interface 1000 of NTLS 10 displaying a search results interface 1002.

Referring to FIGS. 3 and 13, search results interface 1002 includes at least a portion 1004 of summary data 62, a "Searched on values field" 1006, and a "Select Document" button 1008. User interface 900 is displayed on the client system 14 when the user selects "Submit Query" button 910 (shown in FIG. 12). Search results interface 1002 facilitates the user searching technical information 60 by providing at least a portion 1004 of summary data 62 for technical information 60 containing the user specified terms. The user can move through search results interface 1002 using the web-browser. Selection of select document button 1008 returns user to user interface 600 (shown in FIG. 9) for user review. In an exemplary embodiment, user interface 1000 is displayed in a limited portion of client system 14, such as a pop-up box. In another embodiment user interface 1000 includes help interface links, and a return link to return to user interface 400.

FIG. 14 is an exemplary embodiment of a user interface 1100 of NTLS 10 displaying an advanced search interface 1102. User interface 1100 is displayed on the client system 14 when the user selects "Advanced Search" button 912 (shown in FIG. 12). Advanced search results interface 1102 includes a library selection field 1104, a searchable fields area 1106, and a "Submit Query" button 1110. Searchable fields area 1106 includes fields for the user to provide at least one of document name 112, document number 1114, document revision 1116, document author 1118, keywords 1120, and publication date 1122. Searchable fields area 1106 also includes "Limit Search" field 1124 and include all revisions field 1126. Advanced search results interface 1102 facilitates searching summary data 62 for technical information 60 in the specified library. In an exemplary embodiment, user interface 1100 is displayed in a limited portion of client system 14, such as a pop-up box. In another embodiment user interface 1100 includes help interface links, and a return link to return to user interface 400. The user can move through search results interface 1002 using the web-browser. Selection of select document button 1008 provides user interface 600 for user review.

As described, NTLS 10 includes a database 20 for validated technical information 60 related to selected plants and systems, which provides reliable and up-to-date technical information. NTLS provides multiple users with access to a single validated technical information source. NTLS 10 reduces paper-based information by providing up-to-date, validated technical information on-line, improving user and administrator efficiency.

While the invention has been described in terms of various specific embodiments, those skilled in the art will recognize that the invention can be practiced with modification within the spirit and scope of the claims.

What is claimed is:

1. A method for providing technical information to nuclear power plant engineers using a network-based system including a server system in communication with a database and at least one client system, said method comprising:

storing technical information in the database, the database comprising a manual service library, a technical bulletin library, and an analysis information library, the manual service library including technical information related to nuclear power plant equipment including equipment manuals, the technical bulletin library including technical information related to nuclear power plant technical bulletins and regulatory agency documents, the analysis information library including technical information related to nuclear power plant analysis information reports and regulatory agency analysis documents;

appending summary data to the technical information;

validating the technical information; and providing the technical information in response to an inquiry from an authorized user.

2. A method in accordance with claim 1 wherein storing the technical information comprises obtaining technical information in computer usable form.

3. A method in accordance with claim 1 wherein appending summary data comprises appending at least one of document number, document name, document revision, author, publication date, upload date, keywords, and comments to the technical information.

4. A method in accordance with claim 1 wherein validating comprises updating the database with revised technical information and revised summary data.

5. A method in accordance with claim 1 wherein validating comprises modifying summary data appended to the technical information.

6. A method in accordance with claim 1 wherein validating comprises checking the technical information and appended summary data.

7. A method in accordance with claim 1 wherein providing the technical information comprises:

displaying on the client system a pull down list of the technical information; and receiving a request from the client system regarding the technical information from the pull down list.

8. A method in accordance with claim 1 wherein providing the technical information comprises:

downloading requested technical information from the server system; and displaying requested technical information on the client system in response to the inquiry.

9. A method in accordance with claim 1 wherein providing the technical information comprises:

accepting identification of at least one summary data element from the client system; and searching the database for matching summary data element.

10. A method in accordance with claim 1 wherein providing the technical information comprises:

displaying information on the client system identifying summary data appended to the technical information; and receiving a request from the client system regarding the technical information.

11. A method in accordance with claim 1 wherein providing the technical information comprises:

accessing the database;

searching the database regarding the specific inquiry;

retrieving information from the database; and transmitting the retrieved information to the client system for display by the client system.

12. A method in accordance with claim 1 wherein the client system and the server system are connected via a network, the network comprising one of a wide area network, a local area network, an intranet and the Internet.

13. A method for providing technical information to nuclear power plant engineers using a network-based system including a server system in communication with a database and at least one client system, said method comprising:

storing technical information in the database in sub-libraries in computer usable form, the sub-libraries comprising a manual service library, a technical bulletin library, and an analysis information library, the manual service library including technical information related to nuclear power plant equipment including equipment manuals, the technical bulletin library including technical information related to nuclear power plant technical bulletins and regulatory agency documents, the analysis information library including technical information related to nuclear power plant analysis information reports and regulatory agency analysis documents;

appending summary data to the technical information, including at least one of document number, document name, document revision, author, publication date, upload date, keywords, and comments;

validating the technical information including updating the database with revised technical information and revised summary data, modifying summary data appended to the technical information, and checking the technical information and appended summary data; and providing the technical information in response to an inquiry from the client system via the network, including displaying on the client system a pull down list of the technical information, receiving a request from the client system regarding the technical information from the pull down list, downloading requested technical information from the server system, and displaying requested technical information on the client system in response to the inquiry, the client system and the server system connected via the network including at least one of a wide area network, a local area network, an intranet, and the Internet.

14. A computer program embodied on a computer readable medium for providing technical information to nuclear power plant engineers, said program comprising a code segment that:

receives technical information;

maintains a database by adding, deleting and updating technical information, the database comprising a manual service library, a technical bulletin library, and an analysis information library, the manual service library including technical information related to nuclear power plant equipment including equipment manuals, the technical bulletin library including technical information related to nuclear power plant technical bulletins and regulatory agency documents, the analysis information library including technical information related to nuclear power plant analysis information reports and regulatory agency analysis documents;

maintains the database by adding, deleting and updating summary data appended to technical information;

validates technical information; and provides said technical information to authorized users.

15. A computer program in accordance with claim 14 further comprising a code segment that selects technical information based on at least one of document number, document name, document revision, author, publication date, upload date, keywords, and comments.

16. A computer program in accordance with claim 14 further comprising a code segment that appends summary data with technical information.

17. A computer program in accordance with claim 14 further comprising:

a code segment that accesses said database;

a code segment that searches said database in response to an inquiry;

a code segment that retrieves information from said database; and a code segment that causes retrieved information to be displayed on said client system.

18. A computer program in accordance with claim 14 further comprising a code segment that monitors the security of the system by restricting access to authorized individuals.

19. A computer program in accordance with claim 14 further comprising a code segment that validates said technical information.

20. A network-based system for providing technical information to nuclear power plant engineers, said network-based system comprising:

a client system comprising a browser;

a database for storing information;

a server system configured to be in communication with said client system and said database, said server system further configured to:

receive technical information;

store said technical information in said database, said database comprising a manual service library, a technical bulletin library, and an analysis information library, said manual service library including technical information related to nuclear power plant equipment including equipment manuals, said technical bulletin library including technical information related to nuclear power plant technical bulletins and regulatory agency documents, said analysis information library including technical information related to nuclear power plant analysis information reports and regulatory agency analysis documents;

append summary data to said technical information;

validate said technical information; and provide technical information in response to an inquiry.

21. A network-based system in accordance with claim 20 wherein said client system further comprises:

a displaying component for displaying at least one of a pull-down list, a check box, and a data entry field relating to technical information; and a sending component to send an inquiry to said server system so that said server system can process and download said requested technical information to said client system.

22. A network-based system in accordance with claim 21 wherein said server system configured to provide technical information in response to an inquiry further configured to:

download requested information from a server system; and display requested information on a client system in response to said inquiry.

23. A network-based system in accordance with claim 20 wherein said system is configured to restrict access to authorized individuals.

24. A network-based system in accordance with claim 20 wherein said server system further comprises:

a collection component for collecting technical information;

a validating component for validating technical information;

a displaying component for displaying technical information;

a receiving component for receiving an inquiry from said client system regarding technical information; and an accessing component for accessing said database and causing said retrieved technical information to be displayed on said client system.

25. A network-based system in accordance with claim 20 wherein said server system further comprises a processing component for processing received inquiries and searching said database.

26. A network-based system in accordance with claim 20 wherein said server system further comprises a processing component for validating technical information.

27. A network-based system in accordance with claim 20 wherein said server system further comprises a retrieving component to retrieve technical information from said database.

28. A network-based system in accordance with claim 20 wherein said server system further comprises an information fulfillment component that downloads said requested technical information after retrieving said requested technical information from said database.

* * * * *